United States Patent Office 2,898,933
Patented Aug. 11, 1959

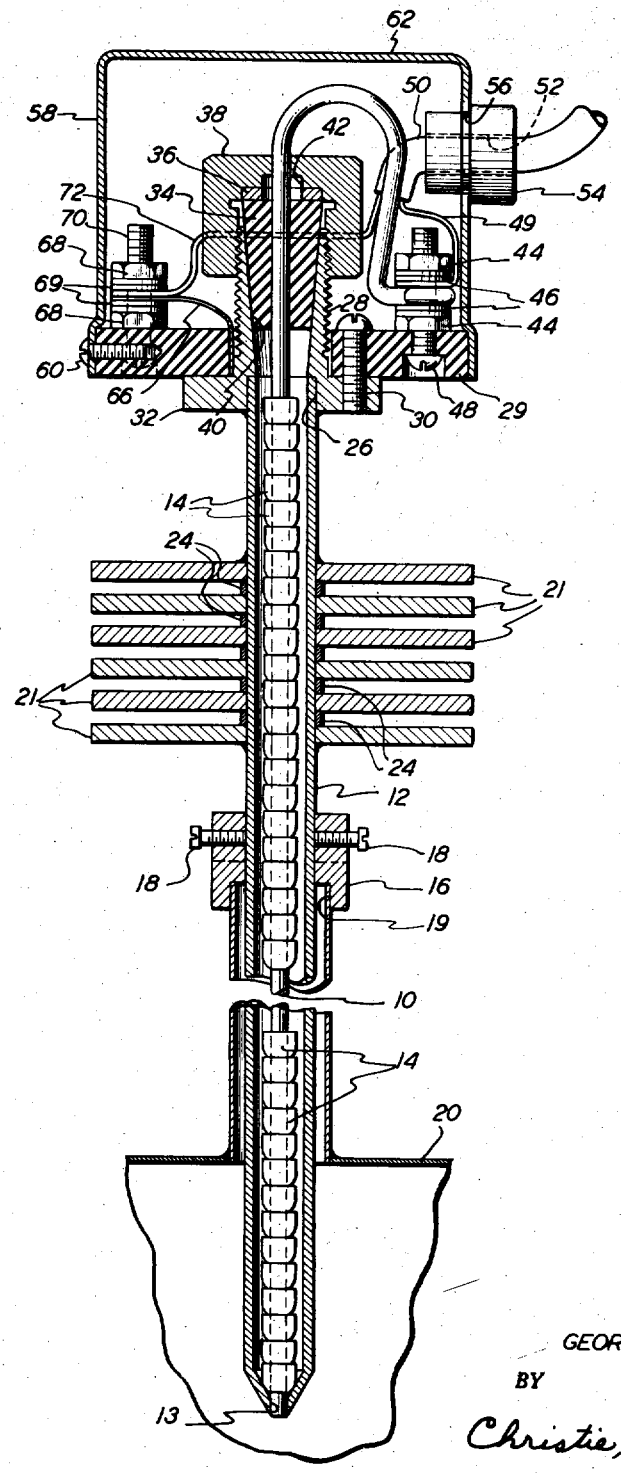

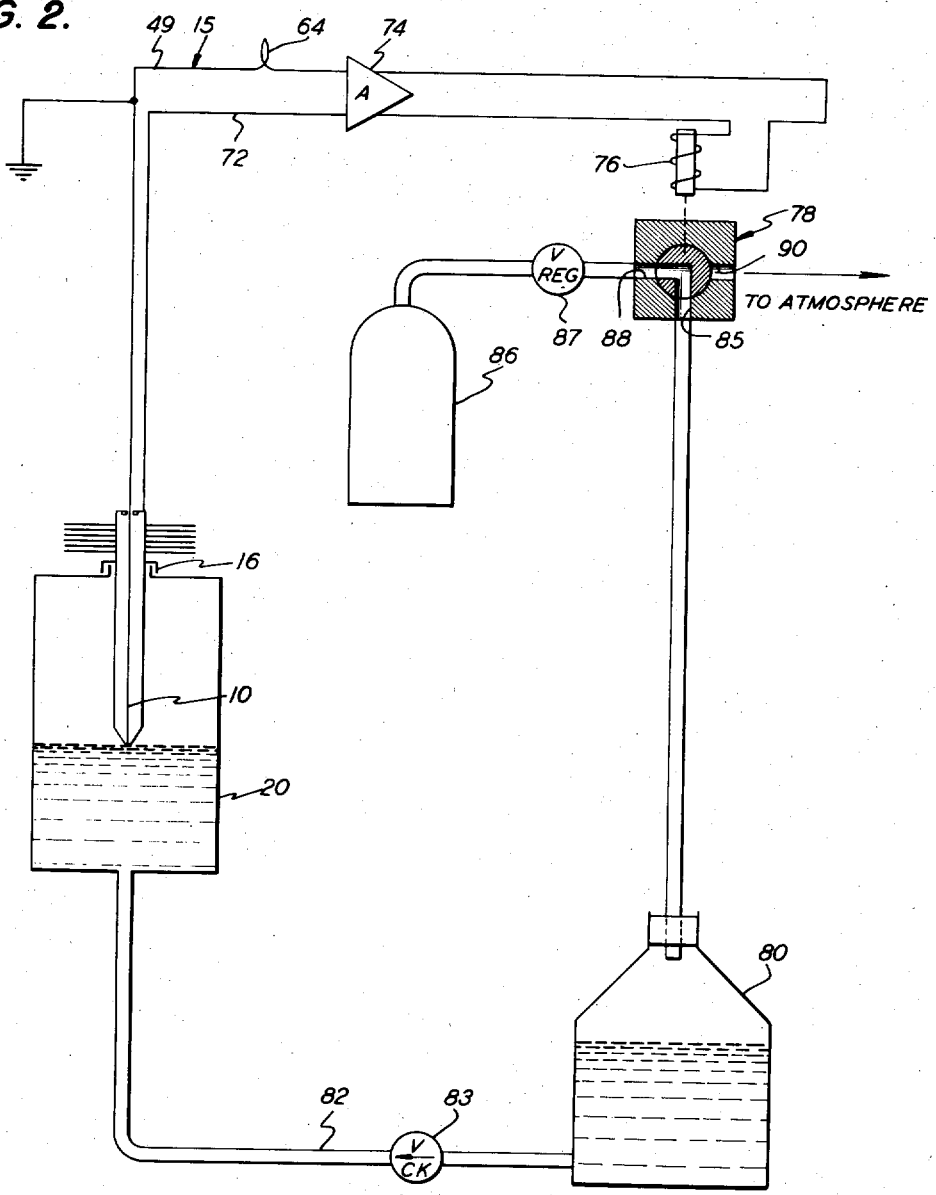

2,898,933
LIQUID LEVEL CONTROL APPARATUS

George H. Bancroft, Rochester, N.Y., assignor to Consolidated Electrodynamics Corporation, Pasadena, Calif., a corporation of California Application October 11, 1956, Serial No. 615,373

5 Claims. (Cl. 137—392)

This invention relates to thermocouples and to systems using thermocouples for control.

The invention provides an improved thermocouple element which is particularly suitable for determining and controlling the level of a substance in a container.

One of the more important applications of the thermocouple element of this invention is that of remotely determining or regulating the level of liquid nitrogen or other cold liquid material maintained at atmospheric pressure in a cold trap which is either entirely open or substantially closed.

Cold traps are often used to improve the pumping efficiency of vacuum systems using vapor-operated pumps, and present the problem of maintaining a correct level of refrigerant in the trap. In many cases liquid nitrogen is used and its level in the cold trap must be carefully regulated to avoid the level either falling too low, which would result in inefficient operation of the trap, or from rising too high and overflowing from the cold trap, which would result in possible danger to personnel and waste of an expensive material.

This invention provides a sensitive thermocouple element which can accurately determine the level of liquid nitrogen or other substance in a container, and the invention also provides a system using the thermocouple element in which the level of the substance in the container is maintained at a substantially constant value.

Briefly, the thermocouple element is a thermocouple junction which includes an elongated hollow body of one metal, and an elongated conductor disposed in the body and bonded to it at one end. Preferably, the conductor is spaced and insulated from the body by insulating beads disposed around the conductor for substantially the entire length of the body. In the preferred form, the end of the body remote from the junction of the conductor and the body is sealed around the conductor to prevent the accumulation of moisture or other material which might cause a shorting across the conductor within the body.

Also in the preferred form, the body has a substantially greater thermal conductivity than the conductor, and means are provided intermediate the ends of the body to increase the heat transfer between the intermediate portion of the body and its immediate surroundings so that the temperature of the juncture of the body and conductor rapidly approaches the ambient temperature of the intermediate portion of the body whenever the juncture is not subjected to a substantial transfer of heat through it.

The preferred control system for automatically maintaining a substance in a container at a substantially constant level includes a thermocouple having a first junction disposed in the container at the level at which the substance is to be maintained and having a second junction at another location. A supply vessel for the substance is connected by a conduit to the container, and means responsive to the thermocouple output are provided for moving the substance from the vessel to the container when the level of the substance is below the first thermocouple junction.

These and other aspects of the invention will be more fully understood from the following detailed description taken in conjunction with the accompanying drawings, in which:

Fig. 1 is a sectional elevation of the presently preferred embodiment of the thermocouple element; and Fig. 2 is a schematic diagram of the thermocouple junction of Fig. 1 used in the presently preferred system for controlling the level of a substance in the container.

Referring to Fig. 1, the thermocouple element includes an elongated solid cylindrical conductor rod 10 coaxially disposed within an elongated cylindrical upright body 12. The lower end of the conductor rod is welded in a vertical bore 13 at the lower end of the body, which is tapered to a reduced diameter, the lower end of the rod being flush with that of the body.

A plurality of insulating beads 14 are coaxially disposed around the conductor rod and spaced from the interior of the cylindrical body. The junction of the conductor rod and the cylindrical body form a first junction of a thermocouple 15, shown schematically in Fig. 2. The body and conductor rod may be of any two suitable thermocouple metals, such as copper and constantan (60% copper plus 40% nickel). Preferably, the metal with the higher thermal conductivity is used to form the body, and in the element shown in Fig. 1, the body is copper and the conductor rod is constantan, which has a thermal conductivity less than $\frac{1}{10}$ that of copper.

A cylindrical positioning collar 16 is coaxially disposed around an intermediate portion of the body and may be moved longitudinally with respect to the body and held in any desired position by means of horizontal set screws 18 threaded through the collar to bear against the exterior of the body. The lower portion of the positioning collar has a bore 19 of increased diameter which is adapted to receive the upper end of the neck of a cold trap 20, which supports the thermocouple element coaxially in the cold trap neck.

A plurality of horizontal and circular copper fins 21 are coaxially disposed around and bonded to the body above the positioning collar. A plurality of annular spacers 24 are coaxially disposed around the body and bonded to it between adjacent fins. To insure good thermal contact, the fins and spacers are preferably silver soldered to the body. The upper end of the body is bonded, for example, silver soldered, in a vertical bore 26 in the lower end of a bushing 28. The bore 26 is stepped down to a reduced diameter in the lower portion of the bushing and then tapers upwardly and outwardly to open at the upper end of the bushing with a diameter equal to that of bore 26. A horizontal circular terminal base plate 29 of a suitable insulating material, such as plastic, is secured by screws 30 to the upper side of the annular lip 32 formed around the lower end of the bushing 28. A tapered rubber stopper 34 is held in the tapered bore of the bushing by a washer 36 and a terminal seal nut 38 threaded on to the upper end of the bushing. The upper end of the conductor rod extends out of the upper end of the body, through the tapered bore in the bushing, through a bore 40 in the rubber stopper, which makes a snug seal around the conductor rod, and through a bore 42 in the upper end of the terminal seal nut. The upper end of the conductor rod is connected between a pair of locking nuts 44 and washers 46 on an inverted vertical first terminal screw 48 secured in the bottom of the terminal base and projecting up above it. A constantan wire 49 is also connected to the first terminal screw and extends into a protective sheath 50 which passes through a horizontal and coaxial bore 52 in a strain relief bushing 54 press-fitted into a horizontal bore 56 in the side of a cylindrical cover box 58 secured at its lower end by screws 60 around the terminal base. The upper end of the cover box is closed by top closure 62. The constantan wire terminates at a second thermocouple junction 64 (shown only in Fig. 2).

One end of a copper foil strip 66 is firmly held between the bushing 28 and in the terminal base. The other end of the copper foil strip is secured between nuts 68 and washers 69 on an inverted upright second terminal screw 70 secured in the bottom of the terminal base and projecting above it. One end of a copper wire 72 is connected to the second terminal screw and extends out through the protective sheath of the thermocouple extension wire. The other end of the copper wire is connected to the constantan wire at the second junction of the thermocouple.

Fig. 2 shows schematically the thermocouple element of this invention supported by the positioning collar on the neck of the cold trap. The first junction of the thermocouple is at the level at which a cold substance, say liquid nitrogen, is to be maintained in the cold trap. The second junction of the thermocouple is outside the cold trap and is maintained at a relatively high temperature, say room temperature, compared to that of liquid nitrogen. The output of the thermocouple is fed into an amplifier 74, the output of which is fed into a coil 76 of a solenoid operated valve 78.

The bottom portion of a supply vessel 80 containing liquid nitrogen is connected by an insulated conduit 82 to the bottom of the cold trap. A check valve 83 in the insulated conduit permits flow through it only in the direction from the supply vessel to the cold trap. A control conduit 84 extends from a first opening 85 of the valve to the top of the supply vessel 80. A cylinder of pressurized gas, say nitrogen, 86, is connected through a pressure regulator 87 to a second opening 88 in the valve. A third opening 90 in the valve is vented to atmospheric pressure. With the solenoid coil de-energized, that is, receiving no signal from the amplifier, the valve is in the position shown in Fig. 2 so that pressure is supplied from cylinder 86 to the top of the liquid nitrogen stored in the supply vessel. This forces liquid nitrogen through the insulated line into the cold trap until the level of the liquid nitrogen in the cold trap reaches the bottom of the first thermocouple junction. The temperature of the first junction then drops markedly, generating a signal at the amplifier input. This actuates the solenoid valve to connect the top of the supply vessel to atmospheric pressure, and no more liquid nitrogen is forced into the cold trap. The check valve prevents liquid nitrogen from flowing back out of the cold trap.

When the level of the liquid nitrogen in the cold trap drops, e.g., due to evaporation below the first junction of the thermocouple, the junction warms up rapidly because of the heat supplied through the fins and down the copper body. The thermocouple ceases generating a signal of sufficient strength to keep the solenoid actuated, and the valve returns to the position shown in Fig. 2, thereby repeating the above cycle. The fins also aid in keeping the air in the body above its dew point to avoid condensation of moisture on the electrical connections within the body.

I claim:

1. A system for automatically maintaining a substance in a container at a substantially constant level, the system comprising a thermocouple having a first junction disposed in the container at the level at which the substance is to be maintained and having a second junction at another location, a supply vessel for the substance, a conduit connecting the vessel to the container, and means responsive to the thermocouple output for moving the substance from the supply vessel to the container when the level of the substance is below the first thermocouple junction.

2. A system for automatically maintaining a substance in a container at a substantially constant level, the system comprising a thermocouple having a first junction disposed in the container at the level at which the substance is to be maintained and having a second junction at another location, means for maintaining a temperature difference between the substance and the second thermocouple junction, a supply vessel for the substance, a conduit connecting the vessel to the container, and means responsive to the thermocouple output for moving the substance from the vessel to the container when the level of the substance is below the first thermocouple junction.

3. A system for automatically maintaining a substance in a container at a substantially constant level, the system comprising a thermocouple having a first junction disposed in the container at the level at which the substance is to be maintained and having a second junction at another location, means for maintaining a temperature difference between the substance and the second thermocouple junction, a supply vessel for the substance, a conduit connecting the vessel to the container, moving means for moving the substance from the vessel to the container, and a valve responsive to the thermocouple output for controlling the moving means to move the substance from the vessel to the container when the level of the substance is below the first thermocouple junction.

4. A system for automatically maintaining a substance in a container at a substantially constant level, the system comprising a thermocouple having a first junction disposed in the container at the level at which the substance is to be maintained and having a second junction at another location, means for maintaining a temperature difference between the substance and the second thermocouple junction, a supply vessel for the substance, a conduit connecting the vessel to the container, a source of pressure, valve means connecting the source of pressure to the supply vessel, and means responsive to the thermocouple output for controlling the valve means to pressurize the supply vessel and move the substance from the vessel to the container when the level of the substance is below the first thermocouple junction.

5. A system for automatically maintaining a substance in a container at a substantially constant level, the system comprising a thermocouple having a first junction disposed in the container at the level at which the substance is to be maintained and having a second junction at another location, means for maintaining a temperature difference between the substance and the second thermocouple junction, a supply vessel for the substance, a conduit connecting the vessel to the container, and moving means for moving the substance from the vessel to the container, solenoid valve means for controlling the moving means, and an amplifier connected to the thermocouple output and solenoid valve means for actuating the valve means to move the substance from the vessel to the container when the level of the substance is below the first thermocouple junction.

References Cited in the file of this patent

UNITED STATES PATENTS

| | | |
|---|---|---|
| 2,318,479 | Gillis | May 4, 1943 |
| 2,756,765 | Agule et al. | July 31, 1956 |